Feb. 5, 1957 W. M. WHITE ET AL 2,780,153
AUTOMATIC CONTACT PRINTER
Filed July 16, 1953 6 Sheets-Sheet 1

WILLIAM M. WHITE
ROBERT A. FOX
INVENTORS

BY *Daniel I. Mayne*

*[signature]*
ATTORNEYS

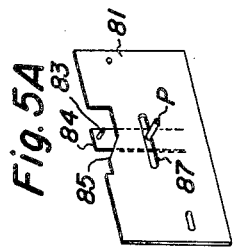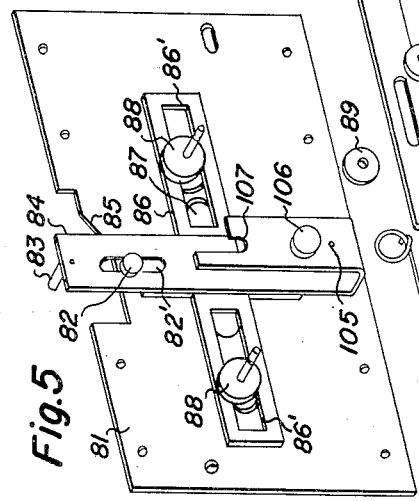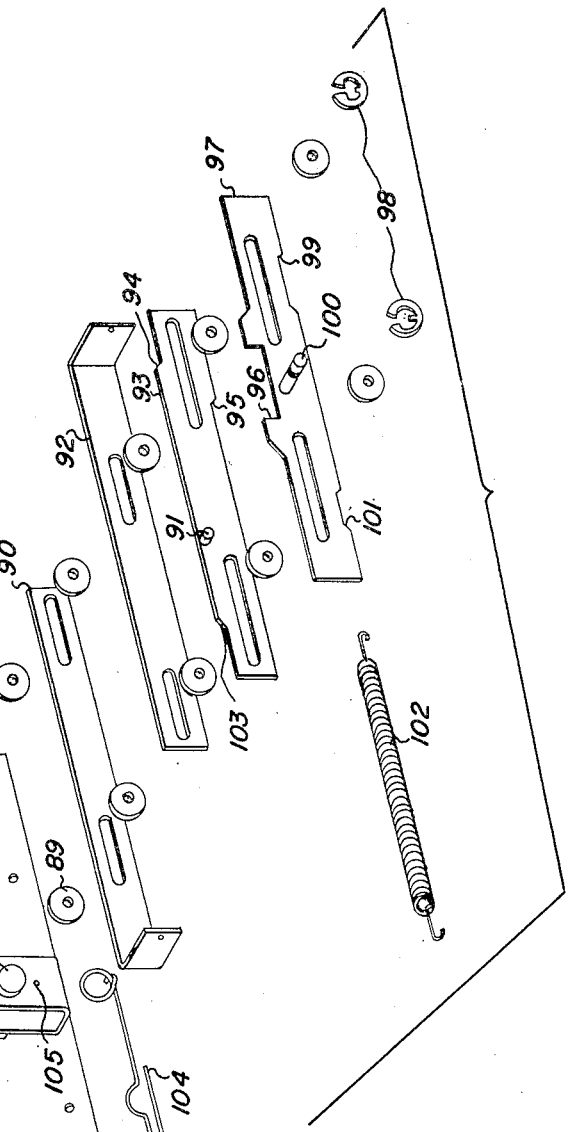

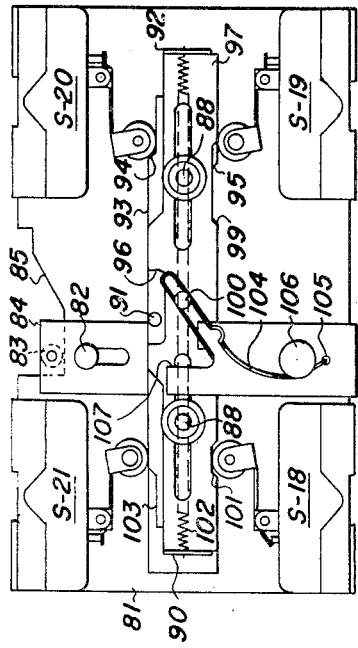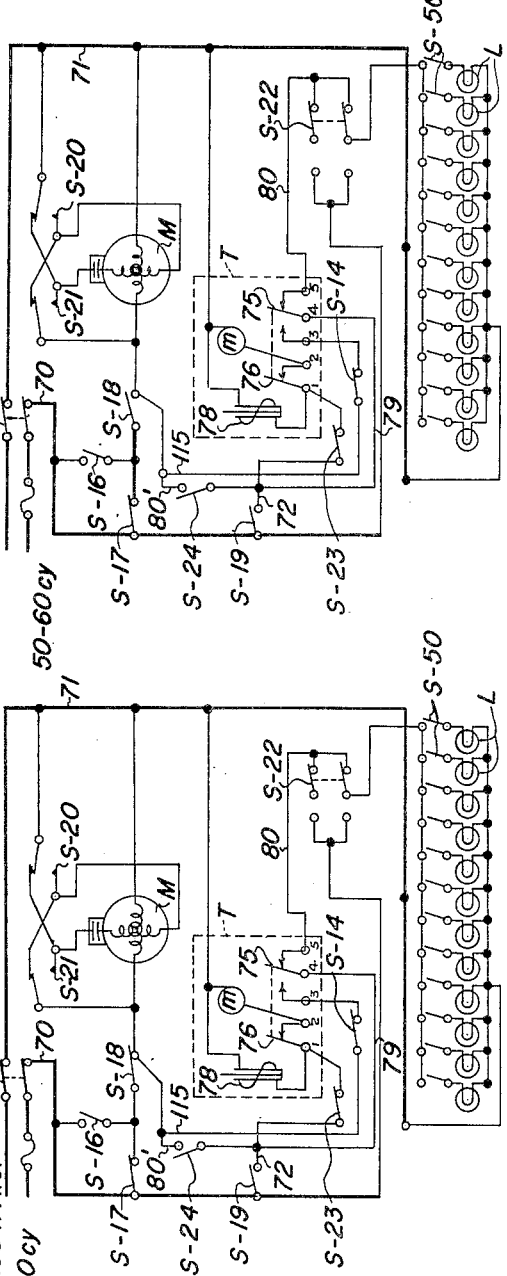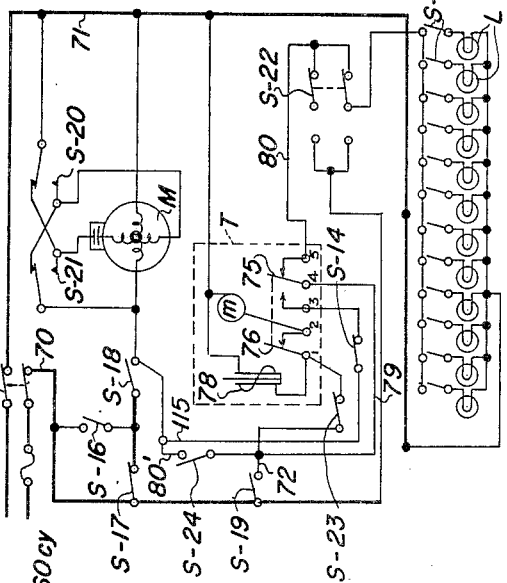

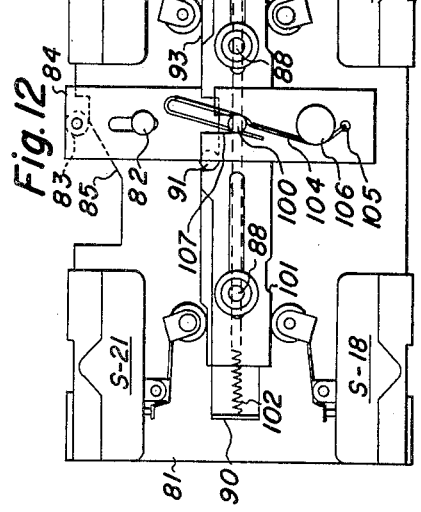
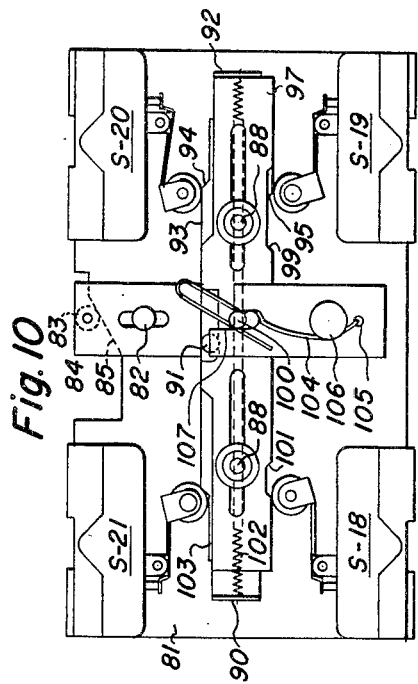
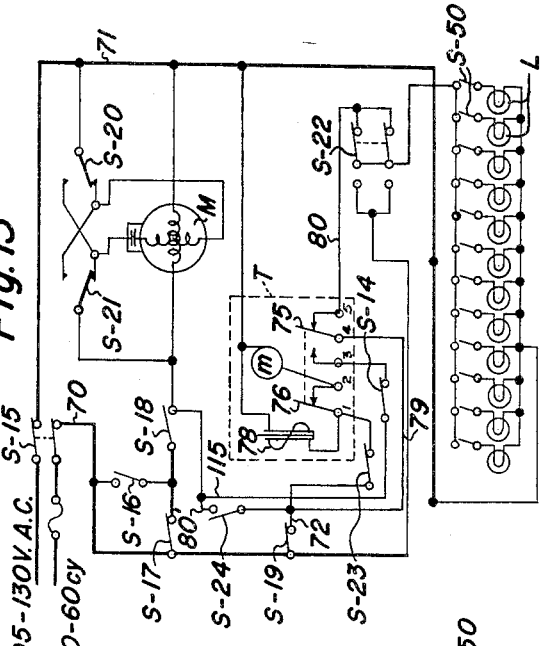
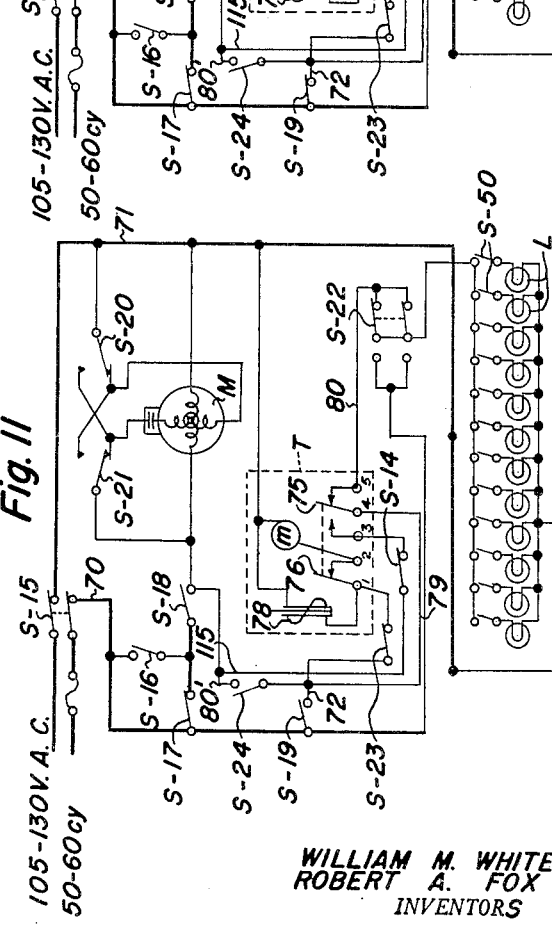
WILLIAM M. WHITE
ROBERT A. FOX
INVENTORS
ATTORNEYS

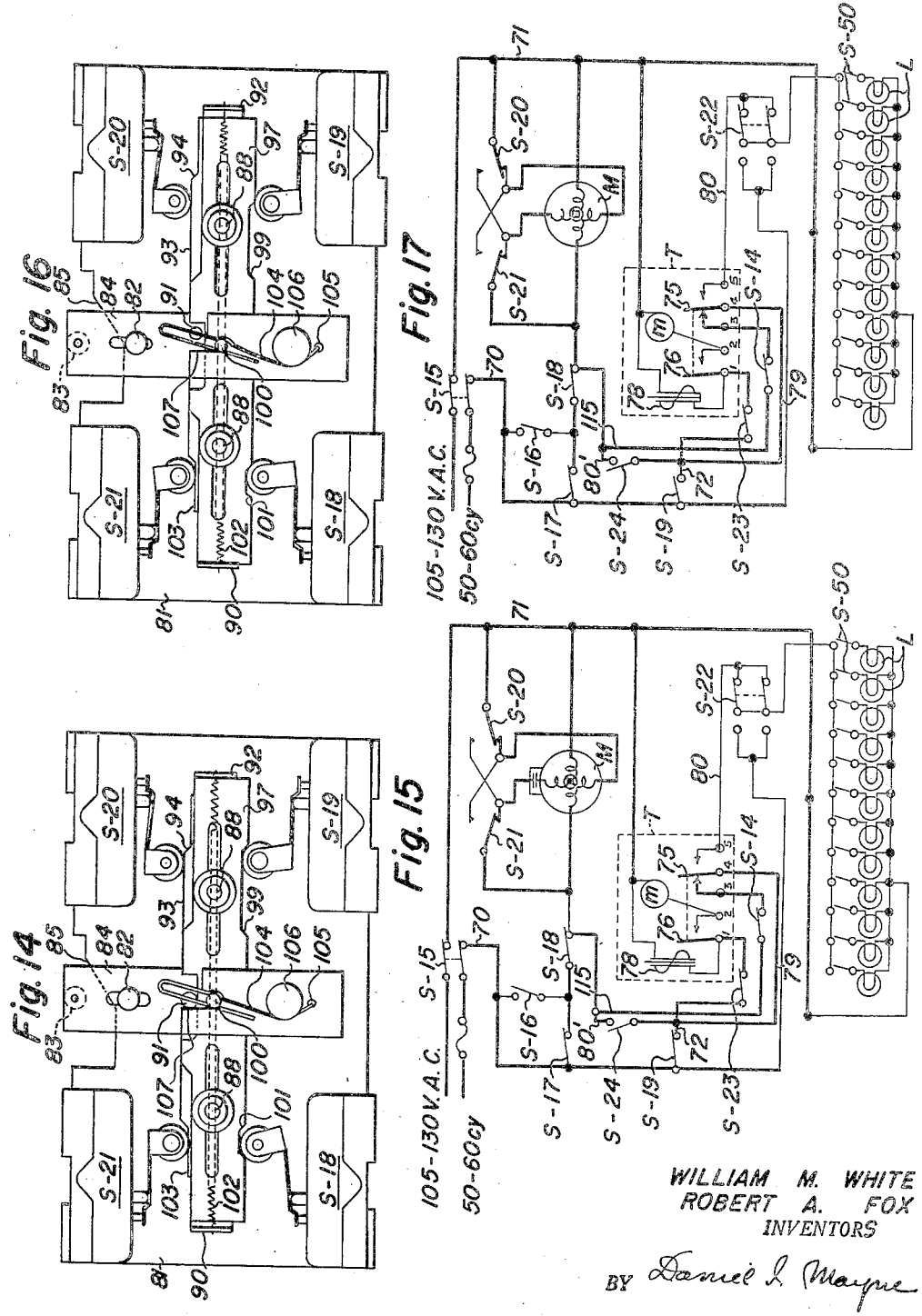

Feb. 5, 1957     W. M. WHITE ET AL     2,780,153
AUTOMATIC CONTACT PRINTER
Filed July 16, 1953     6 Sheets-Sheet 6
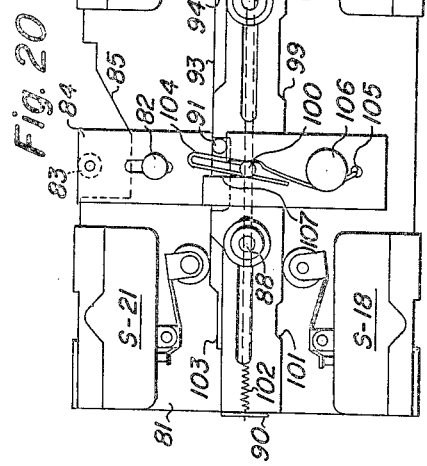
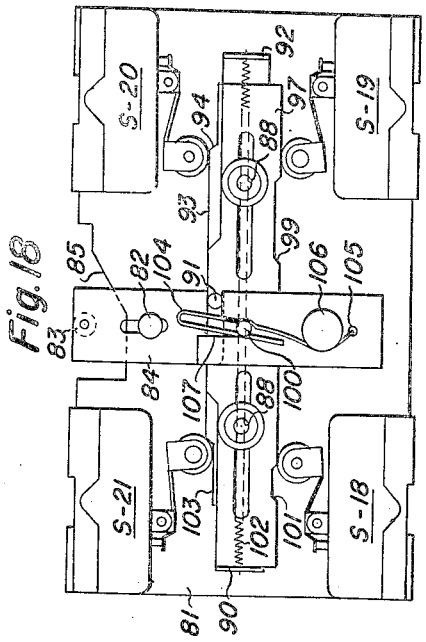
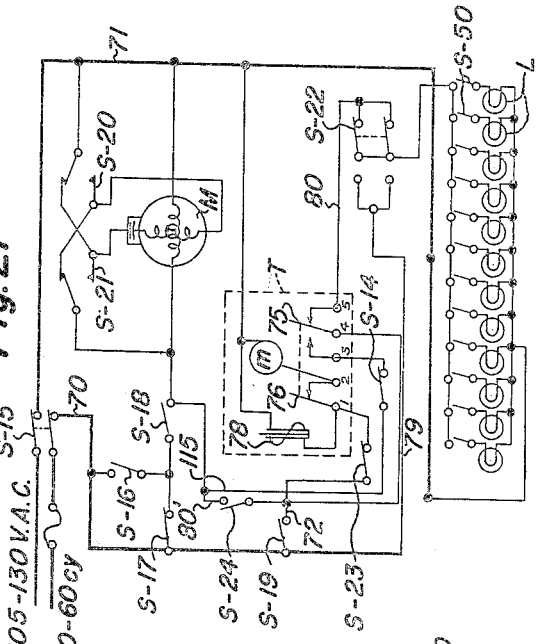
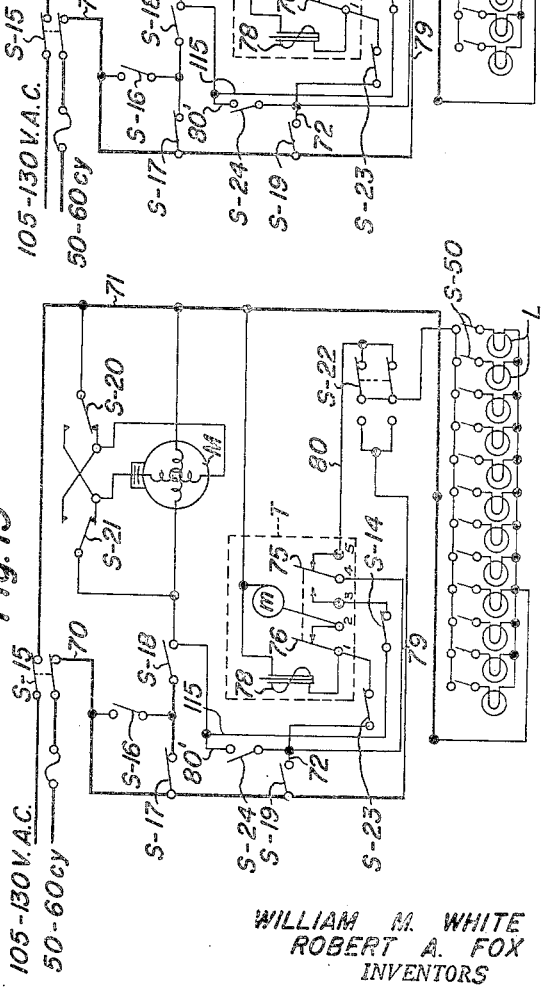
WILLIAM M. WHITE
ROBERT A. FOX
INVENTORS
BY *Daniel J. Magee*
*Karl T. [signature]*
ATTORNEYS United States Patent Office 2,780,153
Patented Feb. 5, 1957

2,780,153

AUTOMATIC CONTACT PRINTER

William M. White and Robert A. Fox, Rochester, N. Y., assignors to Eastman Kodak Company, Rochester, N. Y., a corporation of New Jersey Application July 16, 1953, Serial No. 368,364

6 Claims. (Cl. 95—73)

This invention relates to photographic contact printers, and particularly to an improvement in the operating circuit and control means therefor of the automatic printer shown in U. S. Patent 2,533,481 which issued December 12, 1950.

In this printer, the hinged platen is moved from a normally raised position to a negative and paper-holding position by a reciprocal carriage which is driven forwardly and rearwardly of the printer top by a driving mechanism including a reversible motor. This printer is automatic in operation in that upon actuation of a manual switch, such as a foot switch, the motor is started and drives the carriage forwardly to lower the platen. When the carriage reaches its forward position, the motor is deenergized, its polarity is changed so that the next time it is energized it will operate in the reverse direction, the printing lamps are turned on, and a timer is started. At the end of a predetermined time cycle, the printing lamps are turned off and the motor is again energized to return the carriage and allow the platen to raise. As the carriage reaches its rearward position, the motor is stopped, its polarity is reversed, and the platen in raising opens a switch in the control circuit which prevents a repeat of the cycle until the manual switch is again operated.

The control circuit of this printer is rather complicated in that it involves the use of a self-energized reversing relay in the motor circuit for reversing the polarity on the driving motor and a multiposition relay controlled by the timer connected in control relation with said motor relay. The proper operation of this control circuit necessitates the operation of four switches in proper sequence, two being at the front of the printer top and two being at the rear of the printer top, and both arranged to be engaged and operated by the motor-driven carriage itself. By virtue of the fact that these four switches are widely separated and must be operated by the same movable part of the printer (the carriage), it is a particularly difficult job to adjust them for the proper sequence operation. Furthermore, the use of a self-energizing reversing relay, and the control circuits necessitated by its use, for obtaining the desired reverse of the carriage driving motor has been found to be troublesome and expensive.

One object of the present invention is to provide an improved and simplified control circuit for this contact printer. Another object is to provide an improved method of mechanically controlling the sequence operation of the switches on the above printer which permits easy and rapid adjustment of the switches for operation in the proper sequence without necessitating individual adjustment of the location of the switches. And a further object is to provide a mechanical control for the switch sequence which comprises grouping four of the switches together on a common supporting plate so that they may be operated by interconnected notched slide bars. And another object is to provide a mechanical control for the switch sequence which permits the four switches to be assembled and properly adjusted on their supporting plate as a subassembly independent of the printer, and allows the subassembly of switches then to be mounted on the printer and connected to the carriage-driving mechanism for proper operation without further adjustment.

The novel features that we consider characteristic of our invention are set forth with particularity in the appended claims. The invention itself, however, both as to its organization and methods of operation, together with additional objects and advantages thereof, will best be understood from the following description when read in connection with the accompanying drawings in which:

Fig. 5 is an exploded perspective view showing the component parts that go to make up the switch-mounting plate and slide bar assembly constructed in accordance with a preferred embodiment of the present invention;

Fig. 5A is a rear perspective view, on a reduced scale, of the switch-mounting plate shown in Fig. 5;

Figs. 6–21 are views showing the control switch assembly constituting the present invention in successive positions of operation during a complete printing cycle along with schematic wiring diagrams of the control circuit corresponding to each successive switch position. For example, Fig. 7 shows the condition of the printer circuit when the switch assembly is in the position shown in Fig. 6. Likewise, Figs. 8 and 9, 10 and 11, 12 and 13, etc. correspond to one another.

Briefly stated, the present invention relates to an improved method of controlling the sequence operation of the switches in the contact printer shown in U. S. Patent 2,533,481. While the present printer is essentially the same from a structural standpoint, and goes through the same cycle in making a print, as the patented printer, the present invention involves modifying the electrical control circuit of said printer whereby four of the switches may be grouped together so that they can be operated by interconnected notched slide bars controlled by the movement of the motor-driven carriage which controls the lowering and raising of the platen.

Figure 1:
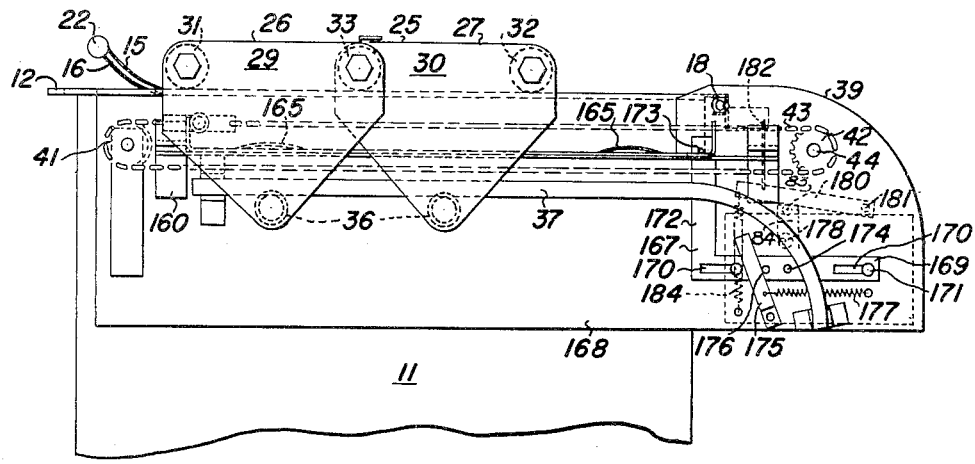
Fig. 1 is a side elevational view of the top portion of a contact printer embodying the present invention, and showing the motor-driven carriage in its forward, or platen-lowering, position.
Figure 3:
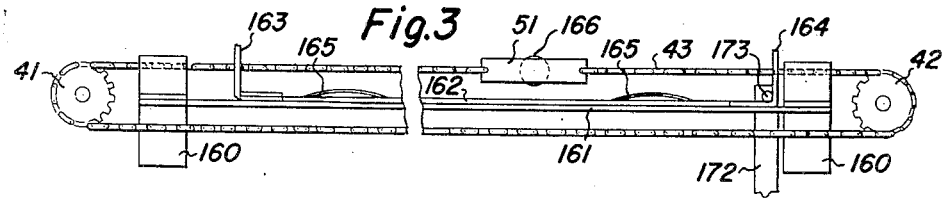
Fig. 3 is a side elevational view showing the connection between the drive chain for the carriage and the switch-operating slider.
Figure 2:
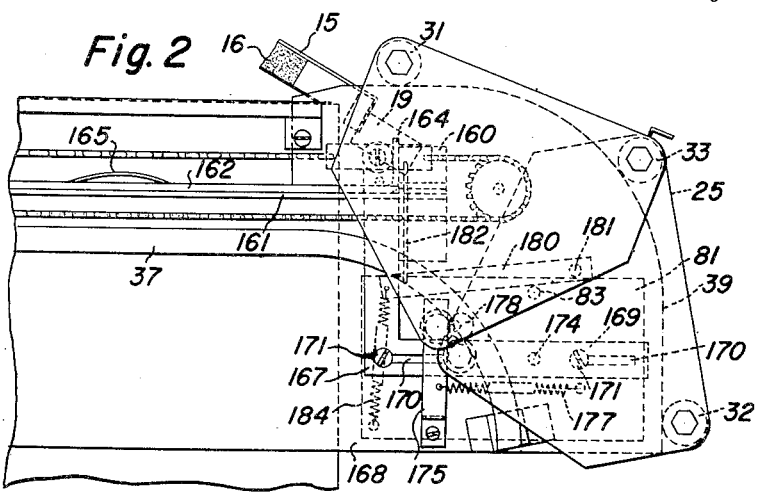
Fig. 2 is an enlarged view of the rear top corner of the printer shown in Fig. 1, and showing the carriage moved to its rearward position wherein the platen is allowed to raise. This view is enlarged to clearly show the connection between the platen and the carriage-driving mechanism and the switch-operating mechanism.

Inasmuch as the present printer, so far as its general mechanical structure and principle of operation are concerned, is the same as that shown in U. S. Patent 2,533,481, to which reference can be had for a detailed description thereof, only so much of the mechanical features of the printer will be described herein as is necessary for an understanding of the present invention. As shown in Figs. 1, 2 and 3, the printer comprises a housing 11, the top 12 of which is provided with a printing aperture, not shown, over which the negative and sensitive paper are to be placed as is well known. The housing has positioned therein the means by which the sensitized paper may be exposed, such means comprising a plurality of lamps L connected in parallel with a separate switch for each lamp so that the lamps can be selectively operated to produce special effects if so desired, see Fig. 7.

The negative and sensitized paper are held in contact over the printing aperture by a platen, generally indicated by the numeral 15, which consists of a curved flexible metal sheet approximately .020" thick. On the convex or underside of the platen is cemented a half-inch sheet 16 of "air foam" type of rubber. The rear end of the platen is pivoted on a pivot bar 18 carried by the back of the housing 11 adjacent the top thereof, see Fig. 1. The rear end of the platen has connected thereto an angle iron 19 to which is attached one end of a coiled spring to automatically move the platen, when free, as will be described later, to its raised position, shown in Fig. 2. While the platen may be manually moved to its lowered position on top of the printer by means of a handle 22, it is preferred to provide means such as a movable carriage, generally indicated by the numeral 25, for moving the platen to, and holding it in, its lowered or operative position during the printing operation. Movement of this carriage is also utilized to operate and control the printing lights and various other mechanisms essential to carrying out the printing cycle.

This carriage 25 comprises a pair of U-shaped plates 26 and 27 terminating in triangularly-shaped end pieces 29 and 30, respectively, as shown in Figs. 1 and 2. The upper front edges of the end pieces 29 and the upper rear edges of the end pieces 30 have journalled therein rollers 31 and 32. The adjacent corners of pieces 29 and 30 overlap and form bearings for an intermediate roller 33 which lies in the same plane as rollers 31 and 32. It will be apparent that the roller 33 affords a hinge connection between the plates 26 and 27 so that the latter and the rollers 31, 32 and 33 may be arranged in a plane during the printing operation, see Fig. 1, or the plates may be pivoted about roller 33 to move the plates and the rollers out of a plane when the carriage is in its rearward or inoperative position, see Fig. 2, the purpose of which is to allow the platen to move to its normally raised position.

In order to hold the negative and printing paper in proper position over the exposure aperture on top of the printer during printing, the lower corner of each plate 29 and 30 has mounted thereon a roller 36. These rollers 36 engage the underside of a track or guide 37 fixed to and extending from the side wall of the housing 11 such that the rollers 31, 32 and 33 engage the platen 15 to compress the layer of rubber 16 to hold the printing paper in firm contact with the printing aperture. The travel of the carriage and rollers 31, 32, 33 and 36 is in a straight line until the carriage reaches a point adjacent the rear of the housing. At this point, the upper rollers 31, 32 and 33 are picked up by a pair of spaced curved rails 39 while the lower rollers 36 move onto a correspondingly curved portion of track 37. During movement over the curved rails 39, the plates 26 and 27 pivot about the middle roller 33 so that the plates are no longer in a plane, see Fig. 2.

While the carriage may be moved between its forward operative position, see Fig. 1, and its rearward position, wherein it allows the platen to raise, by manual manipulation, it is preferred to provide a power drive for the carriage and to utilize the platen and movement of the carriage to operate and/or control the various electrical switches and circuits. To this end, each side of the housing 11, adjacent the top thereof, has mounted thereon a pair of spaced and alined sprockets 41 and 42 over which an endless chain 43 is wrapped. The first sprockets 41 are idlers, but the rear sprockets 42 are pinned or otherwise fastened to a shaft 44 which is suitably connected, by means not shown, to a reversible drive motor M so that the chain may be selectively driven in both directions. In order that such movement of the chains may be utilized to move the carriage back and forth, the carriage has the front end of each end plate 29 pivotally connected to a link 51 in the upper reach of one chain.

Up to this point, the present printer is structurally the same as the one shown in U. S. Patent 2,533,481. While the control circuit, and the operating means therefor, constituting the present invention, and now to be described, produces an automatic printing cycle similar to that of the patented printer, the circuit is much simpler and permits the use of a novel switch operating assembly which is superior to that used in the prior art printer.

The printing cycle to be carried out in this printer consists in driving the carriage forwardly to lower the platen, then turning the printing lights on and leaving them on for a given time to make an exposure, and then driving the carriage rearwardly to allow the platen to raise. This cycle is to be automatic and is initiated by actuation of a manually-operated switch and automatically stopped when the platen is raised. This means that the driving motor for the carriage must be set for reverse operation each time the carriage reaches one end of its travel.

Referring now to Fig. 7, the control circuit which will provide this printing cycle will be described. The main circuit comprising lines 70 and 71 is connected to any source of power by a main switch S–15. The reversible driving motor M for the carriage is connected in a motor circuit extending between power lines 70 and 71, and, while it may be any kind of reversible driving motor, except one having a shaded pole because of the reversing arrangement used, it has been shown as one of the capacitor start—capacitor run type. The starting field of the motor has two single-pole double-throw reversing switches S–20 and S–21 connected in criss-cross relation therein for reversing the polarity on the motor and thereby reversing its direction of drive. The motor circuit includes a motor switch S–18 and a normally-open platen switch S–17 which is closed when the platen is lowered and allowed to open and stop the motor when the platen is raised. The platen switch S–17 is shunted by a manually-operated normally-open switch, i. e. a foot switch, S–16 which permits starting the motor M when the platen is in its raised position to initiate a printing cycle.

Connected across the main circuit in parallel with the motor circuit is a timer circuit 72 including a reset timer T having a synchronous motor "m," a single-pole double-throw switch 75 adapted to be timed out by the motor, a simple switch 76 and a solenoid 78 for controlling the clutch of the timer. This timer per se is a commercially available item and one timer of this type which is available is the Cycle-Flex Reset Timer made by the Eagle Signal Company. Pole or contact 1 of switch 76 of the timer is connected into the timer circuit 72 and includes switch S–23. Common pole 4 of switch 75 in the timer is connected into the timer circuit by line 79, while pole 3 is connected into the motor circuit ahead of the motor switch S–18 by line 115 which includes nonreturn switch S–14. Pole 5 of switch 75 is connected to the lamp circuit 80 so that when manual switch S–22 is in the position shown in Fig. 7 the timer will control the energization of the printing lamps L which can be selectively placed in circuit by operation of manual switches S–50. Throwing switch S–22 to its other position, the printing lamps L can be manually controlled exclusive of the timer. A line 89' connecting the timer circuit to the motor circuit ahead of motor switch S–18 includes a manually-operated timer interruption switch S–24 by means of which control of the motor circuit can be selectively taken away from the timer. The over-all timer circuit is controlled by a timer switch S–19.

In order for the printer to automatically carry out a complete printing cycle upon momentary operation of the foot switch S–16, the two reversing switches S–20 and S–21, the motor switch S–18, and the timer switch S-19 must be operated in a proper sequence as will be described hereinafter. According to the present invention, this proper switch sequence operation is accomplished through the use of a novel switch assembly and switch-operating mechanism now to be described. The components of the switch-operating mechanism are fully disclosed in the exploded perspective view of Fig. 5, whereas the complete assembly, including the switches, and successive position of the parts during a printing cycle, are shown in Figs. 6, 8, 10, 12, 14, 16, 18 and 20. The motor-reversing switches S-21 and S-20, the motor switch S-18, and the timer switch S-19 are not shown in Fig. 5, but an inspection of Fig. 6 will show that these four switches are to be fixedly mounted at the four corners of the switch-mounting plate 81.

Referring now particularly to Fig. 5, a release slide bar 84 is mounted to the driver slide bar 86 by two shoulder studs 82, only one of which is visible. The elongated slots 82′ in the release slide bar 84 allow it to travel up and down on the studs 82. The driver slide bar 86 is in turn mounted on the switch-mounting plate 81 by two shoulder studs 88. The long rectangular slots 86′ in the driver slide bar 86 allow it to travel horizontally on the studs 88 and at the same time carry the release slide bar 84 with it. A pin 83 riveted to the back side of the release slide bar 84 engages with cam surface 85 of the switch-mounting plate 81. Thus, if the driver slide bar 86 is moved from the extreme left to the extreme right, and the release slide bar 84 is started in its lowest position, this travel will cause pin 83 to engage the cam 85 and will result in the raising of the release slide bar 84. As explained later, the release slide bar 84 is held in this upper position during return travel by the detent spring 104.

Attached to the back side of the driver slide bar 86 is a pin P, not visible in Fig. 5, but shown in Fig. 5A, which protrudes through the slot 87 in the switch-mounting plate. Forces applied to this pin, as will be later explained, drive the slide bars through the operation to be subsequently described. It will be noted that the release slide bar 84 has its lower end turned up to form a channel shape so that the four remaining slide bars may be mounted over the two studs 88 and in this channel, see Fig. 6. Also, it will be noted that a graphite phenolic washer 89 is to be mounted over each of the studs 88 and between each of the slide bars.

Two centering slide bars 90 and 92 are mounted, as indicated, over the studs 88 along with the reversing slide bar 93 and the motor switch slide bar 97, and all are held in assembled relation by the two retaining rings 98. Spring 102 is engaged in the holes in the upturned ends of the centering slide bars 90 and 92, and the force of this spring draws the ends of the centering bars together. However, the dimensions and the position of their elongated slots are such that the studs 88 limit this inward travel so that the motor switch slide bar 97 just fits between their upturned ends. Conversely, if the motor switch slide bar 97 is displaced horizontally approximately one-half inch to the right, looking at Figs. 5 and 6, it expands the spring 102 by carrying the centering slide bar 92 along with it. Upon being released, the motor switch slide bar 97 is returned to its original position by the force of the spring 102 acting upon the centering slide bar 92. This spring return is also effective for travel of the motor switch slide bar 97 to the left, since the spring 102 also acts on the centering slide bar 90. In the remainder of this specification and in the claims this central position will be referred to as the neutral position.

The reversing slide bar 93 is shorter in overall length than, and does not engage with, the ends of the centering slide bars 90 and 92. It is, in turn, driven by pin 91 which engages with slot 96 in the motor switch slide bar 97. The location of this pin 91 and the length of the slot 96 are such that the motor switch slide bar 97 travels approximately one-half inch either side of its neutral position. It picks up and carries along with it the reversing slide bar 93 for approximately the last one-quarter inch of travel, i. e. the reversing slide bar 93 only travels approximately one-quarter inch to the right, then approximately one-quarter inch to the left.

Pin 100 on the motor switch slide bar 97 engages in the yoke-type slot 107 of the release slide bar 84. The detent spring 104 is positioned over the shoulder stud 106 with its short end anchored in the hole 105. The long end of the detent spring 104 is then moved in a clockwise direction until it passes over and engages with the groove in the pin 100, see Figs. 6 and 12. The function of this yoke 107 is to drive the motor switch slide bar 97 forward or to the right looking at Figs. 5 and 6, during which travel the release slide bar 84 is raised by the action of cam 85 on pin 83 until pin 100 is retained by both sides of the yoke slot 107, see Fig. 12. The release slide bar 84 is then held in this upper position by the detent action of the detent spring 104 on pin 100. Now it is possible to drive the motor switch slide bar 97 through its neutral position and all of the way to the left, see Fig. 20. Then, by pushing the release slide bar 84 downwardly, the pin 100 is disengaged from the yoke 107 whereupon the motor switch slide bar 97 is free to assume its neutral position even though the release slide bar 84 is held in its extreme left position, see Fig. 1.

The two reversing switches S-21 and S-20, the motor switch S-18, and the timer switch S-19, which are pressure-sensitive switches of a well-known type, are mounted on the switch-mounting plate 81 in the manner shown in Fig. 6.

The rollers of the reversing switches S-21 and S-20 contact the upper edge of the reversing slide bar 93, or lose contact with the slide bar when the notches 94 or 103 are positioned under these rollers. This movement of the reversing slide bar actuates these two switches. The center-to-center distance of the two reversing switches is such that when the roller of switch S-20 is in notch 94 the roller of switch S-21 is on the top surface of the reversing slide bar, as illustrated in Fig. 6. When the reversing slide bar 93 is moved about one-quarter inch to the right, the action of these two switches is reversed. The roller of switch S-21 is in the notch 103 and roller of switch S-20 is on top of the reversing slide bar 93, as illustrated in Fig. 12. It should be noted that the motor switch slide bar 93 does not contact the rollers of these two top switches.

The roller of motor switch S-18 is positioned in notch 101 of the motor switch slide bar 97 when the latter is in its neutral position. Movement of this slide bar 97 to the right or left raises the roller out of the notch and actuates the switch. This is illustrated in Figs. 8, 10, 12, 18 and 20. At no time does this switch roller contact the reversing slide bar 93.

The roller of timer switch S-19 is actuated by both the slide bars 93 and 97. In Figs. 6, 8 and 10 it will be seen that even though the motor switch slide bar 97 is traveling to the right, the roller is retained by the lower surface of the reverse slide bar 97. In Fig. 12, both slide bars 97 and 93 have moved to the right together, allowing the roller of switch S-19 to enter notch 95 on the reversing slide bar 93. In Fig. 14, the motor switch slide bar 97 has started its leftward travel, but has not raised the roller of switch S-19 fully out of notch 99. However, further travel to the left forces the roller out of notch 99 and onto the lower surface of the motor switch slide bar 97.

Figure 4:
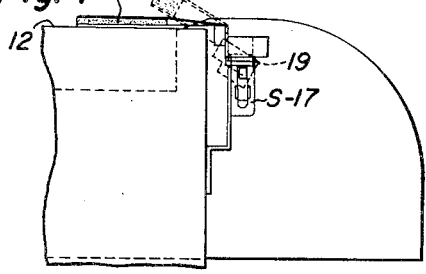
Fig. 4 is a side elevational view of the top rear corner of the printer with the carriage and its driving mechanism removed to show how the platen in raising opens a switch in the control circuit.

The sequence of operation of switches S-20, S-21, S-18 and S-19 necessary to carrying out a printing cycle automatically can be followed by referring to Figs. 6, 8, 10, 12, 14, 16, 18 and 20, showing successive positions of the switch-operating assembly, and the accompanying schematic wiring diagrams showing the change in the control circuit of the printer corresponding to such changes in position of the switch-operating mechanism. To facilitate such understanding, it might be again pointed out that the platen switch S-17 is opened when the platen is raised and closed when the platen is lowered. To this end, the platen switch S-17 is shown as one of the pressure-sensitive type mounted on the rear of the housing 11 in such a position as to be engaged and opened by the angle iron 19 on the rear end of the platen when said platen is raised and is allowed to close when the platen is lowered, see Fig. 4.

Referring now to Figs. 6 and 7, the switch-operating mechanism is in the position it assumes at the end of a printing cycle, and the reversing switches S-21 and S-20 are set to cause the motor to drive in a direction to move the carriage 25 forwardly. In Fig. 7, the printing cycle has been started by depressing the platen switch S-17. This is accomplished by momentarily closing the manual or foot switch S-16 shunting the platen switch S-17 and which starts the motor M causing the carriage to move far enough to close the platen switch. Figs. 6 and 7 show that the motor switch S-18 is in the closed position since its roller is in notch 101. The timer switch S-19 is out of its notches and is open. S-21 and S-20, the motor-reversing switches, are in the position for forward run of the motor. The circuit to the drive motor has been completed and the carriage has started its forward run.

Looking now at Figs. 8 and 9, the motor switch S-18 has just been actuated, turning off the drive motor M. Just prior to this, carriage 25, as it approached the last half-inch of forward travel, engaged with a drive linkage, which is described hereinafter, and moved the driver slide bar 86 along with the release slide bar 84 and the motor switch slide bar 97 about one-sixteenth of an inch to the right. This travel of the motor switch slide bar 97 has moved the notch 101 from the roller of switch S-18 to turn off the motor and has brought the slot 96 in contact with pin 91. The release slide bar 84 has started its upward travel as pin 83 is in contact with cam 85.

Looking now at Figs. 10 and 11, the two reversing switches S-20 and S-21 have just been actuated by the forward coasting of the carriage moving the slide bars approximately another one-sixteenth of an inch to the right. The roller of switch S-21 is now in notch 103 and the roller of switch S-20 is out of notch 94. Next time the motor circuit is completed to energize the driving motor, it will return the carriage to its rearward position.

When the parts move to the position shown in Figs. 12 and 13, the timer switch S-19 has just been operated with the completion of the forward travel of the carriage and the final movement of the slide bars to the right. This allows the roller of switch S-19 to drop into notches 95 and 99. The release slide bar 84 has reached the top of its travel and is retained in this raised position by detent spring 104. Note that the centering slide bar 92 has been moved to the right, extending spring 102. The closing of the timer switch S-19 energizes the timer T and energizes the bank of printing lamps L through the closed terminals 4 and 5 of switch 75 in the timer. At the same time, the motor m of the timer T is energized through terminals 1 and 2 of the timer switch 76 to start the timing operation.

When the timer times out and reaches zero, its internal snap action switches are actuated, resulting in:

(1) Opening switch 76, turning off the timer motor m;
(2) Opening contacts between poles 4 and 5 of switch 75, turning off the printing lamps L;
(3) Closing switch between poles 3 and 4, energizing the drive motor M for the return run of the carriage.

The solenoid 78 in the timer serves to actuate a clutch, as well known, and since it remains or stays energized, the timer does not reset at this time.

The return movement of the carriage first causes switch-operating mechanism to assume the position shown in Figs. 14 and 15. As shown, the motor switch S-18 has just been actuated. As the carriage begins its return travel, the slide bars are freed so that they may be moved to the left by the force of spring 102 acting upon the centering slide bar 92. This moves the notch 101 on the motor switch slide bar 97 to the roller of motor switch S-18, closing this switch. The reversing slide bar remains stationary as pin 91 is not engaged with slot 96. The release slide bar 84 is held in its upward position by the detent spring 104. At this instant, the motor is energized by both circuits from the timer T and the motor switch S-18.

When the condition shown in Figs. 16 and 17 is reached, the timer switch S-19 has just been actuated. As the motor switch slide bar moves into its neutral position, notch 99 lifts the roller of switch S-19 out of notch 95. This eliminates the timer T as a source of power for the drive motor M. The solenoid 78 in the timer still remains energized as its current has not been interrupted as to allow the timer to re-set, and contact between terminals 3 and 4 of timer switch 75 is still maintained; 3 being powered from the drive motor circuit through line 115 and 4 being connected to the solenoid 78 through lines 79 and the timer circuit behind timing switch S-19.

In Figs. 18 and 19, the motor switch S-19 has just been actuated. The carriage has approached the end of its return run and in the last one-half inch of travel the carriage driving chain has again engaged with the slide bars, moving them about one-quarter inch to the left of the neutral position. The slot 101 on the motor switch slide bar 97 has moved from the roller of S-18. Pin 91 on the reversing slide bar 93 is about to engage with slot 96. The motor M has just been turned off. The timer T is now deenergized so that it will re-set.

In Figs. 20 and 21, the two reversing switches S-21 and S-20 have just been actuated. The final coasting of the carriage has carried the slide bars another one-quarter of an inch to the left. The two switches S-21 and S-20 are in their original positions, reversing the motor circuit for the next forward run. Note that the centering slide bar 90 has been moved to the left, extending spring 102.

At the end of the printing cycle the platen 15 is allowed to raise, and this opens the platen switch S-17, braking the circuit to the motor switch S-18. Raising of the platen 15 also depresses the release slide bar 84 through a linkage to be described whereupon pin 100 is disengaged from yoke 107 so that the motor switch slide bar 97 can assume its neutral position. This closes the motor switch S-18, but no circuit is completed since the platen switch S-17 already has been opened. The position of the switch-operating bars at this time is the same as that shown in Fig. 6, and the circuit is in the condition shown in Fig. 7, except that the platen switch S-17 is opened instead of closed. The printer is now ready to start another cycle upon closure of the foot switch S-16.

In connection with the above-described operation of the printer control circuit and the switch-operating mechanism for controlling the same, the following points should be noted. Drive motor M is always turned off before its circuit is reversed. The printing cycle may be started by momentarily closing the foot switch S-16, in which case the platen switch S-17 is closed as the carriage comes forward.

Certain refinements may be incorporated in the control circuit such as the normally closed nonreturn switch S-14 and the timer interrupter switch S-24. Should the nonreturn switch S-14 be opened manually, the timer T cannot energize the drive motor M for the return run as illustrated in Fig. 15. Such operation might be desirable to extend the exposure time after the printing cycle has started. After the timer switch S-19 has been closed, the momentary closing of the timer interrupter switch S-24, energizes the drive motor for the return run, and the subsequent opening of the timer switch S-19 turns off the printing lamps L. Such selective operation might be desirable should the operator wish to selectively cut down the exposure time after the printing cycle has been started or should he desire to change the type of printing paper after the cycle has been started and he may not wish to wait for the cycle to go through its full time.

Referring now to Figs. 1, 2, 3 and 5A, the drive linkage between the carriage driving means and the switch-operating assembly will now be described. Fixed to the side wall of the printer housing at the front and rear ends thereof are two Z-shaped brackets 160. Joining these two brackets is a rail 161 on which is slidably mounted a slider 162 having upturned ends 163 and 164. This slider extends parallel to and between the reaches of the chain 43 and is frictionally restrained against movement on a rail 161 by a pair of bowed springs 165, the bowed portions of which extend through slots in the slider and the ends of which lie between the slider and the rail. A roller 166 extends from the face of the link 51 of the chain and is adapted to engage the upturned end 163 of the slider as the carriage approaches its forward position and to engage the upturned end 164 of the slider when the carriage approaches its rearward position. These parts are so disposed that the ends of the slider 162 are engaged by the chain during approximately the last ½" of movement of the carriage to its forward and rearward positions, whereby the total movement of the slider is only 1", ½" in each direction from a neutral position. It is this ½" movement of the slider 162 in each direction which is transmitted through a linkage to pin P of the switch assembly for shifting the switch-operating slide thereof in the manner set forth above.

This linkage consists of an L-shaped lever 167 which is slidably mounted on the outside face of a plate 168 extending to the rear of the printer housing 11. Arm 169 of lever 167 extends horizontally and has a pair of elongated slots 170 engaging studs 171 extending from the plate. The other arm 172 of the lever extends vertically and has a pin 173 extending laterally therefrom which is connected to the slider 162 by welding or other suitable means. The switch assembly shown in Figs. 5 and 6 is mounted on the other face of plate 168, see dotted line position in Figs. 1 and 2, and the pin P extends through a slot, not shown, in the plate and into a hole 174 in the arm 169 of lever 167. In order to return the slider 162 to its neutral position from its full forward position when the carriage moves rearwardly, an arm 175 is pivoted on the plate 168 to engage one side of a pin 176 extending from the arm 169, and this arm is acted on by tension spring 177. An adjustable cam-shaped stop 178 is provided on plate 168 to limit movement of this arm 175 in a clockwise direction so that this spring will not act to hold the lever 167 in its full rearward position when moved thereto by the roller and link 51 engaging the upturned end 164 of the slider.

Looking at Figs. 1 and 2, the pin 83 on the release slide bar 84 is engaged by a lever 180 pivoted at 181 to the plate 168. The free end of this lever is connected to the angle iron 19 on the rear end of the platen by a rigid link 182 pivotally connected to each of these parts. Accordingly, when the platen raises, as shown in Fig. 2, the lever 180 is depressed and pushes down on pin 83 to release the release slide bar from the detent spring 104 whereupon the motor switch slide bar 97 is free to return to its neutral position under the action of centering spring 102. This action occurs right at the end of a printing cycle when the switch assembly is in the position shown in Fig. 20 and whereupon the switch slide bar 97 assumes the position shown in Fig. 6 ready for the next cycle. A tension spring 184 connected between the free end of lever 180 and the plate 168 assists in, or may form the sole means for, raising the platen, see Fig. 2.

Having thus described our invention, what we claim is new and desire to secure by Letters Patent of the United States is:

1. In a photographic printing machine having a top provided with a printing aperture, the combination with a hinged platen movable from a normally raised position and a lowered position to hold a sensitized sheet over said aperture; a reciprocal carriage movable between an inoperative position, wherein it disengages said platen and allows it to raise, and an operative position, wherein it engages and holds said platen in its lowered position; printing lamps in said printer for illuminating said aperture; means for reciprocating said carriage between its two positions and including a reversible motor, a pair of single pole-double throw reversing switches connected in criss-cross relation in the starting circuit of said motor for reversing the drive thereof; a motor switch in the motor circuit, a platen switch in series with said motor switch and adapted to be closed by said platen as it moves from its raised position, a manual switch in shunt relation with said platen switch; a reset timer connected in a timer circuit in parallel relation with said motor circuit and including a synchronous motor for providing the timed interval, a normally closed switch in the timer motor circuit, and a single pole-double throw switch in one position controlling energization of said printing lamps and in its other position energizing said drive motor circuit, a timer switch in said timer circuit, of control means for operating said two reversing switches, said timer switch and said motor switch in the proper sequence to carry out a printing cycle automatically in response to actuation of said manual switch, and including a first switch operating bar reciprocal over a given path and adapted to reverse the positions of said reversing switches at each end of said path, a second switch operating bar reciprocal over a given path to operate said motor switch and timer switch in its travel; and means operated by said carriage reciprocating means for reciprocating said switch bars over their respective paths in timed relation to effect a closing of said switches controlled thereby in proper sequence to effect a single printing cycle.

2. In a photographic printing machine having a top provided with a printing aperture, the combination with a hinged platen movable from a normally raised position to a lowered position to hold a sensitized sheet over said aperture; a reciprocal carriage movable between an inoperative position, wherein it disengages said platen and allows it to raise, and an operative position, wherein it engages and holds said platen in its lowered position; printing lamps in said printer for illuminating said aperture; means for reciprocating said carriage between its two positions and including a reciprocal driver connected to said carriage and a reversible motor for driving said driver; a pair of single pole-double throw reversing switches connected in criss-cross relation in the starting circuit of said motor for reversing the drive thereof; a motor switch in said motor circuit, a normally closed platen switch in series with said motor switch and adapted to be opened by said platen as it moves to its raised position, a manual switch in shunt relation with said platen switch; a reset timer connected in a timer circuit in parallel relation with said motor circuit and including a synchronous motor for providing the timed interval, a normally closed switch in the timer motor circuit, and a single pole-double throw switch in one position controlling energization of said printing lamps and in its other position energizing said drive motor circuit, a timer switch in said timer circuit; of control means for operating said two reversing switches, said timer switch and said motor switch in the proper sequence to carry out a printing cycle automatically in response to actuation of said manual switch, and including a supporting plate, means for mounting said two reversing switches, said timer switch and said motor switch on said plate in spaced relation so that the two reversing switches can be operated in sequence by movement of one operating member and the timer and motor switches can be operated in proper sequence by movement of a second operating member, a pair of switch operating members oscillatably mounted on said plate, one to operate said reversing switches and the other to operate said timer and motor switches, and means operated by the driver for said carriage for oscillating said switch operating members in correspondence with the position of said carriage to produce a printing cycle.

3. A printing machine according to claim 2, characterized by the fact that one of said switch operating members is connected to the driven carriage to be moved thereby, said other switch operating member being connected to said first switch operating member by a lost-motion connection to be driven thereby and said members being so related that said motor switch will be opened before said reversing switches are operated to reverse the polarity on the drive motor so as to prevent arcing of the switch contacts.

4. In a photographic printing machine having a top provided with a printing aperture, the combination with a hinged platen movable from a normally raised position and a lowered position to hold a sensitized sheet over said aperture, a reciprocal carriage movable between an inoperative position, wherein it disengages said platen and allows it to raise, and an operative position, wherein it engages and holds said platen in its lowered position; printing lamps in said printer for illuminating said aperture; means for reciprocating said carriage between its two positions and including a reversible motor, a pair of single pole-double throw reversing switches connected in criss-cross relation in the starting circuit of said motor for reversing the drive thereof; a motor switch in the motor circuit, a platen switch in series with said motor switch and adapted to be closed by said platen as it moves from its raised position, a manual switch in shunt relation with said platen switch; a reset timer connected in a timer circuit in parallel relation with said motor circuit and including a synchronous motor for providing the timed interval, a normally closed switch in the timer motor circuit, and a single pole-double throw switch in one position controlling energization of said printing lamps and in its other position energizing said drive motor circuit, a timer switch in said timer circuit, of control means for operating said two reversing switches, said timer switch and said motor switch in the proper sequence to carry out a printing cylcle automatically in response to actuation of said manual switch, and comprising a supporting plate, means for mounting said reversing switches in spaced alignment on said plate whereby a reciprocal slide bar is adapted to actuate them, means for mounting said motor switch and said timer switch in spaced alignment on said plate whereby a reciprocal slide bar is adapted to actuate them, a reversing switch operating bar slidably mounted on said plate to reciprocate between two positions in each of which it actuates said reversing switches to reverse the drive of said carriage; a second switch operating bar reciprocally mounted on said plate and adapted to actuate said motor switch and timer switch in sequential relation in reciprocating over its path, a lost-motion driving connection between said two switch operating bars whereby movement of one will cause subsequent movement of the other to operate said switches in the proper sequence, and a drive linkage between one of said switch operating bars and the reciprocating means for said carriage whereby said switch operating bar is reciprocated when said carriage moves between its two positions.

5. In a photographic printing machine having a top provided with a printing aperture, the combination with a hinged platen movable from a normally raised position and a lowered position to hold a sensitized sheet over said aperture; a reciprocal carriage movable between an inoperative position, wherein it disengages said platen and allows it to raise, and an operative position, wherein it engages and holds said platen in its lowered position; printing lamps in said printer for illuminating said aperture; means for reciprocating said carriage between its two positions and including a reversible motor, a pair of single pole-double throw reversing switches connected in criss-cross relation in the starting circuit of said motor for reversing the drive thereof; a motor switch in the motor circuit, a platen switch in series with said motor switch and adapted to be closed by said platen as it moves from its raised position, a manual switch in shunt relation with said platen switch; a reset timer connected in a timer circuit in parallel relation with said motor circuit and including a synchronous motor for providing the timed interval, a normally closed switch in the timer motor circuit, and a single pole-double throw switch in one position controlling energization of said printing lamps and in its other position energizing said drive motor circuit, a timer switch in said timer circuit, of control means for operating said two reversing switches, said timer switch and said motor switch in the proper sequence to carry out a printing cycle automatically in response to actuation of said manual switch, and comprising a supporting plate; means for mounting said reversing switches in spaced alignment on said plate for actuation by a reciprocal switch operating bar; means for mounting said motor switch and timer switch in spaced alignment on said plate for actuation of a second reciprocal switch operating bar, means for slidably mounting a reversing switch operating bar on said plate to move between one position, wherein it actuates said reversing switches to drive the reversible motor in one direction, and a second position wherein it actuates said switches in reverse to drive the motor in the other direction; a second switch operating bar slidably mounted on said plate to reciprocate over a given path and actuate said motor switch and timer switch in sequence during such movement, means for spring loading said second switch operating bar to move to a neutral position intermediate the ends of its path of travel and in which position it closes said motor switch and opens said timer switch; a lost-motion driving connection between said two switch operating bars whereby said second bar in moving from its neutral position to either end of its path picks up and moves said reversing switch bar to one end of its path but is free to move from one end of its path back to its neutral position independently of said reversing switch operating bar; and a drive linkage between said second switch operating bar and the carriage reciprocating means whereby said switch operating bar is moved from its neutral position in both directions as said carriage is moved between its two positions.

6. In a photographic printing machine having a top provided with a printing aperture, the combination with a hinged platen movable from a normally raised position to a lowered position to hold a sensitized sheet over said aperture; a reciprocal carriage movable between an inoperative position, wherein it disengages said platen and allows it to raise, and an operative position, wherein it engages and holds said platen in its lowered position; printing lamps in said printer for illuminating said aperture; means for reciprocating said carriage between its two positions and including a reciprocal driver connected to said carriage and a reversible motor for driving said driver; a pair of single pole-double throw reversing switches connected in criss-cross relation in the starting circuit of said motor for reversing the drive thereof; a motor switch in said motor circuit, a normally closed platen switch in series with said motor switch and adapted to be opened by said platen as it moves to its raised position, a manual switch in shunt relation with said platen switch; a reset timer connected in a timer circuit in parallel relation with said motor circuit and including a synchronous motor for providing the timed interval, a normally closed switch in the timer motor circuit, and a single pole-double throw switch in one position controlling energization of said printing lamps and in its other position energizing said drive motor circuit, a timer switch in said timer crcuit; of control means for operating said two reversing switches, said timer switch and said motor switch in the proper sequence to carry out a printing cycle automatically in response to actuation of said manual switch, and comprising a supporting plate; means for mounting said two reversing switches, said timer switch and motor switch on said plate in spaced relation so that the two reversing switches can be operated in sequence by movement of one operating member and the timer and motor switches can be operated in proper sequence by a second operating member, a first switch operating member adapted to control said timer and motor switches and slidably mounted on said plate to move in two directions from a normal position, wherein it closes said motor switch and opens said timer switch, to a first position, wherein it opens said motor switch and closes said timer switch, and a second position wherein it opens both switches; a second switch operating member adapted to control said reversing switches and slidably mounted on said plate in superimposed relation with said first operating member to move between a first position, wherein it operates said switches to cause the drive motor to operate in a direction to lower said platen, and a second position, wherein it reverses the polarity on said motor; a lost-motion connection between said two switch operating members for causing movement of said first switch operating member from its normal position in either direction to slide said second switch operating member to one of its two positions but permitting said first member to return to its normal position independently of said second member; means for spring loading said first operating member to return to its normal position; means for moving said first switch operating member over its path in correspondence with the position of said carriage and including a slide bar slidably mounted on said plate to move in two directions, one the same as said switch operating member and the other at an angle thereto; means for connecting said slide bar to said carriage reciprocating means whereby said bar is moved in opposite directions comparable to that of movement of said switch operating members when said carriage moves toward its two positions; cooperating means on said slide bar and said first switch operating member for selectively connecting said switch operating member to said slide bar to cause said bar to move said member when the bar is moving in one direction, said cooperating means comprising a pin on said first switch operating member, a notch in said slide bar engageable with said pin when said slide bar is moved at an angle to the direction of movement of said switch operating members, means for camming said slide bar into connected relation with said pin when said first switch member is moved to its first position, means for holding said slide bar in this position while the first switch operating member is moved to its second position, and means operated by a raising of the platen to move said slide bar and disconnect it from said first switch operating member whereupon said member is free to move to its normal position.

References Cited in the file of this patent

UNITED STATES PATENTS 2,533,481     Leavitt et al. _____ Dec. 12, 1950